United States Patent
Huelke et al.

(10) Patent No.: US 9,440,590 B1
(45) Date of Patent: Sep. 13, 2016

(54) CARGO SHADE STORAGE POCKET WITH HIDDEN STORAGE

(71) Applicant: Ford Global Technologies, LLC, Dearborn, MI (US)

(72) Inventors: David Huelke, Milan, MI (US); Scott Holmes Dunham, Redford, MI (US); Daniel Clifford, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/682,304

(22) Filed: Apr. 9, 2015

(51) Int. Cl.
  *B60R 7/04* (2006.01)
  *B60R 5/04* (2006.01)
  *B60Q 3/06* (2006.01)

(52) U.S. Cl.
  CPC . *B60R 7/04* (2013.01); *B60Q 3/06* (2013.01); *B60R 5/045* (2013.01)

(58) Field of Classification Search
  CPC ............ B60R 7/04; B60R 5/04; B60R 5/00; B60R 5/045; B60Q 3/06
  USPC ....................... 362/487, 488, 543
  See application file for complete search history.

(56) References Cited

U.S. PATENT DOCUMENTS

| | | | |
|---|---|---|---|
| 3,993,345 A * | 11/1976 | Croup | B60R 11/0217 181/150 |
| 5,372,289 A * | 12/1994 | Dachicourt | B60R 7/10 224/281 |
| 5,685,592 A | 11/1997 | Heinz | |
| 6,416,105 B2 | 7/2002 | Butz | |
| 6,701,995 B1 | 3/2004 | Bogdanski | |
| 7,028,872 B2 * | 4/2006 | Lobanoff | B60R 7/02 211/123 |
| 7,318,617 B1 * | 1/2008 | Scotton | B60R 5/045 224/484 |
| 7,762,602 B2 * | 7/2010 | Bohlke | B60R 5/045 296/37.16 |
| 7,806,753 B2 * | 10/2010 | Holms | A22C 17/004 452/125 |
| 7,934,761 B2 * | 5/2011 | Buehl | B60R 7/02 296/37.1 |

FOREIGN PATENT DOCUMENTS

| | | | |
|---|---|---|---|
| DE | 197 41 628 | * | 3/1999 |
| DE | 100 38 807 A1 | * | 2/2002 |
| DE | 10 2009 041 233 A1 | * | 4/2010 |
| WO | WO 2006/094499 | * | 9/2006 |
| WO | WO 2010/119196 | * | 10/2010 |

* cited by examiner

*Primary Examiner* — Laura Tso
(74) *Attorney, Agent, or Firm* — Vichit Chea; Brooks Kushman P.C.

(57) ABSTRACT

A cover for a vehicle cargo compartment includes a shade having a first end and a second end. The shade extends from the first edge at a distance from a floor of the cargo compartment. The second end is anchored between two side panels. The cover further includes a storage pocket attached to the first edge of the shade. The storage pocket extends in the plane of the shade to a gate. The storage pocket is selectively attached to the gate. The storage pocket defines a pocket including an upper portion, a lower portion, and an attachment mechanism. The attachment mechanism detachably connects the upper and lower portions.

11 Claims, 3 Drawing Sheets

CARGO SHADE STORAGE POCKET WITH HIDDEN STORAGE

TECHNICAL FIELD

The present disclosure relates to cargo shade extenders for vehicles.

BACKGROUND

Vehicles have cargo compartments for storing items required for travel. Vehicles may be equipped with retractable shades used to cover the cargo compartment. The shades extend parallel to a floor of the cargo compartment. The shades provide added protection to the items stored within the cargo compartment and cover them so they are not visible from outside the vehicle. The shades may be supported by inner panels of the vehicle cargo compartment.

The extending portions may use a plurality of handles to extend the shade over the cargo compartment. The extending portions also define an open bin for storing items on top of the package shelf. The bin is configured to loosely store items. Loosely storing items presents problems with items being damaged during travel or being visible from outside the vehicle. Uncovered items disposed within the cargo compartments may be susceptible to theft. Storage compartments disposed on the shade or the extending portion which allow for additional storage and covered protection of the items may be advantageous.

This disclosure is directed to solving the above problems and other problems as summarized below.

SUMMARY

A vehicle storage compartment includes a lift-gate, a shade, and an extender. The lift-gate is disposed between a pair of side panels of a vehicle defining a compartment. The shade has a first end anchored between the side panels and a second end removably attachable to the side panels. The shade extends away from the first end over the compartment. The extender extends from the second end to the lift-gate. The extender has an upper portion and a lower portion connected by an attachment mechanism.

A cover for a vehicle cargo compartment includes a shade having a first end and a second end. The shade extends about the first end at a distance from a floor of the cargo compartment. The second edge is anchored between two side panels. The cover further includes an extender attached to the first edge of the shade. The extender extends to a lift-gate. The extender is demountably engaged to the lift-gate. The extender has an upper portion, a lower portion, and an attachment mechanism. The attachment mechanism detachably connects the upper and lower portions.

An extension for a vehicle cargo cover compartment includes a shade anchored horizontally at a first end between two side panels of a rear portion of a vehicle. The shade extends at a second end at a distance from a floor of the vehicle. The extension has an upper portion attached to the second end of the shade. The upper portion has a first surface. The extension also has a lower portion attached to the second end. The lower portion is disposed below the upper portion. The extension further includes an attachment mechanism connecting the upper and lower portions at the second end that defines a storage compartment of the vehicle.

DETAILED DESCRIPTION

Embodiments of the present disclosure are merely examples and other embodiments can take various and alternative forms. The figures are not necessarily to scale and some features are exaggerated or minimized to show details of particular components. The structural and functional details disclosed are not to be interpreted as limiting, but merely as a representative basis for teaching one skilled in the art how to practice the present invention. The various features illustrated and described with reference to any one of the figures can be combined with features illustrated in one or more other figures to produce embodiments that are not explicitly illustrated or described.

Figure 1:
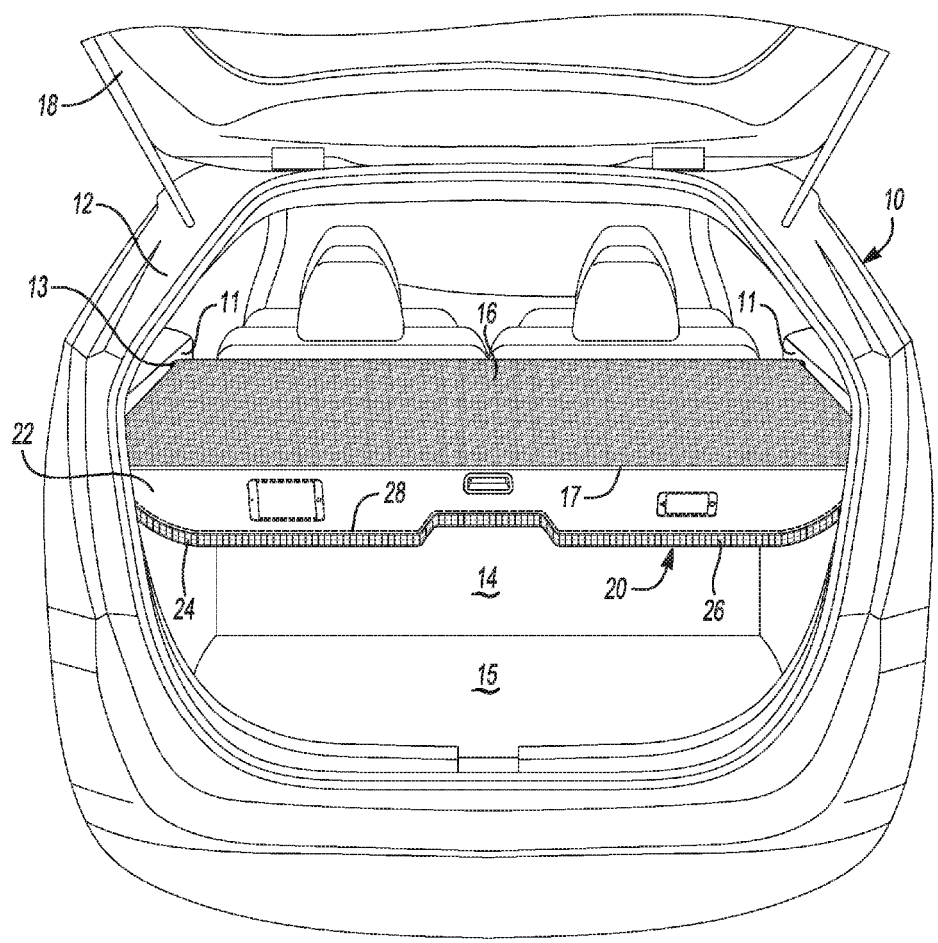
FIG. 1 is a perspective view of a vehicle having cargo compartment shade extender.

FIG. 1 depicts a perspective view of vehicle 10 having a rear portion 12 defining a cargo compartment 14. The rear portion 12 has a cargo shade 16 that extends over and covers the cargo compartment 14. The cargo shade 16 may include a retractor (not shown) and is anchored between side panels 11 of the vehicle 10 at a first end 13. The cargo shade may extend parallel to a floor 15 of the vehicle at a second end 17. In at least one other embodiment, the cargo shade may be disposed at angle with respect the floor 15. The vehicle 10 further includes a lift-gate 18. The lift-gate may be any gate 18 including, but not limited to, a tail-gate. The cargo shade 16 further includes a storage pocket 20.

The storage pocket 20 extends from the cargo shade 16 to the lift gate 18. The storage pocket 20 is selectively attached to the lift gate 18. The storage pocket 20 complements contours of the lift gate 18 and acts as a gap-hider. The storage pocket 20 has an upper portion 22 and a lower portion 24. The upper portion 22 is connected to the lower portion 24 by an attachment mechanism 26, such as a zipper. The attachment mechanism 26 may also be configured to separate the upper portion 22 from the lower portion 24. The upper portion 22 is disposed at a distance from the lower portion 24. The storage pocket 20 defines a storage compartment 28 between the upper portion 22 and the lower portion 24.

The storage compartment 28, defined between the upper portion 22 and the lower portion 24, may be used to store items required for travel. The attachment mechanism 26 may provide access to the storage compartment 28. The zipper may interlock the upper portion 22 and the lower portion 24. The zipper may also provide access to items stored within the storage compartment 28 by separating the upper portion 22 from the lower portion 24. Alternatively, the attachment mechanism 26 may be a snap, hook and loop strap, or magnet that allows connecting and disconnecting between the upper portion 22 and the lower portion 24 of the storage pocket 20.

The storage compartment 28 defined between the upper portion 22 and the lower portion 24 of the storage pocket 20 provides various advantages. For example, the upper portion 22 may be an opaque material that hides objects stored within the storage compartment 28. The upper portion 22 may be a relatively rigid material and provide added protection to the objects stored within the storage compartment 28. The relatively rigid material of the upper portion 22 may also provide support for the additional weight of the objects stored within the storage compartment 28. The lower portion 24 may be a relatively flexible material and allow storage of objects with varying shapes and sizes. Addition of the storage compartment 28 also increases space within the vehicle 10. The space of the cargo compartment 14 is increased by utilizing a location not typically used to store items and providing a storage compartment 28 on the storage pocket 20.

Figure 2:
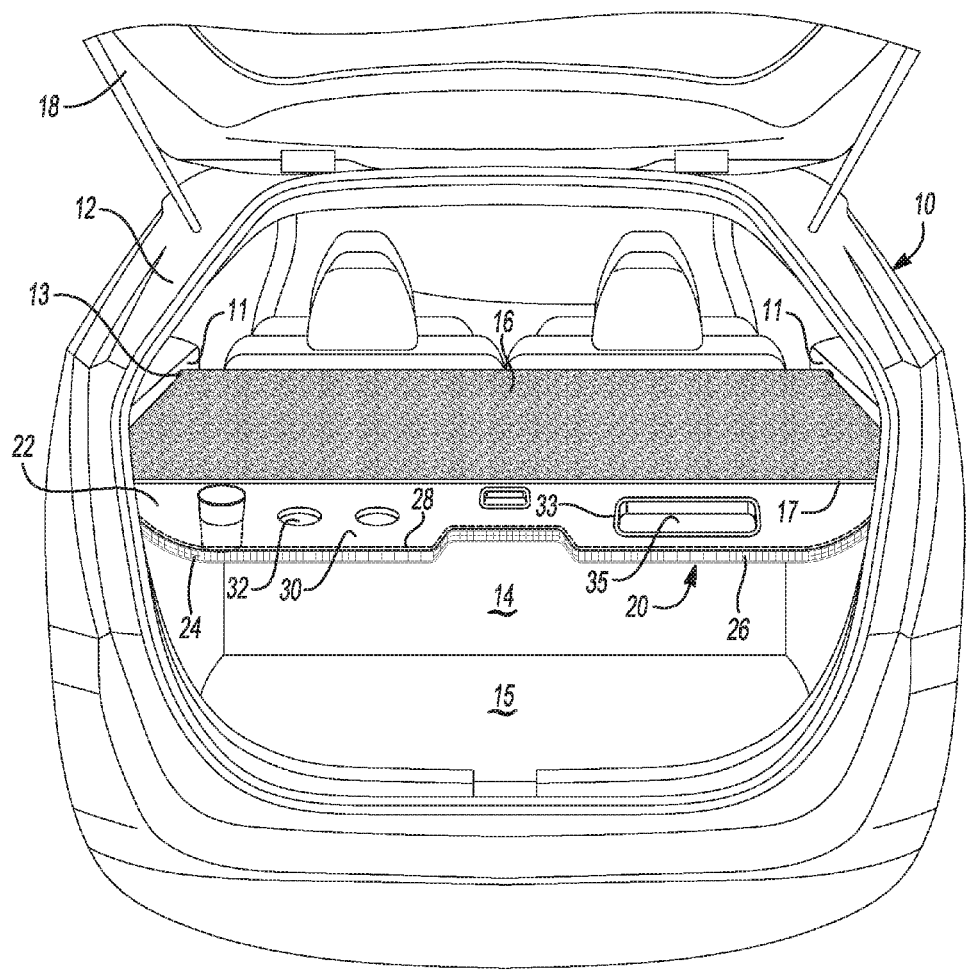
FIG. 2 is a perspective view of a cargo compartment shade extender for a vehicle having a plurality of recesses defined on an upper surface of the extender.

FIG. 2 depicts an alternative embodiment of the storage pocket 20. The upper portion 22 may include a first surface 30 that defines a plurality of recesses 32 on the upper portion 22 of the storage pocket 20. The recesses 32 may extend through the first surface 30 of the upper portion 22. The recesses 32 may be configured to support objects on the first surface 30 of the upper portion 22. Objects requiring a vertical orientation may be stored within the recesses 32 and supported by the first surface 30 of the upper portion 22 of the storage pocket 20. For example, one or more of the recesses 32 may be a cup holder. An insert 33 may also be disposed within the recesses 32 for securing items to the upper portion 22 of the storage pocket 20. The insert 33 may define a cavity 35 for supporting items on the upper portion 22 of the storage pocket 20.

The relatively flexible material of the lower portion 24 allows objects disposed within the recesses 32 to extend into the storage compartment 28. The flexible material of the lower portion 24 allows other objects to be stored within the storage compartment 28 while the first surface 30 is supporting an object extending into the storage compartment 28. The recesses 32 defined on the first surface 30 of the upper portion 22 add to the adaptability of the storage pocket 20. The recesses 32 may be configured to support a variety of objects. For example, the recesses 32 may define a circular shape, a rectangular shape, or any other shape that aids in vertically supporting objects. The recesses 32 may extend through the upper portion 22 or be defined at a specified distance from the first surface 30.

The lower portion 24 may be configured to be detached from the upper portion 22. Longer items requiring more depth may not fit within the storage compartment 28 while the lower portion 24 is attached to the upper portion 22. The lower portion 24 disconnects from the upper portion 22 and hangs freely from the second end 17 of the shade 16 when the storage compartment 28 is not in use. The detachability of the lower portion 22 allows a larger variety of items to be stored vertically within the recesses 32 on the first surface 30 of the storage pocket 20. The variety of items stored on the upper portion 22 of the storage pocket 20 provides flexibility to the storage and organizational capacities of the storage pocket 20.

Figure 3:
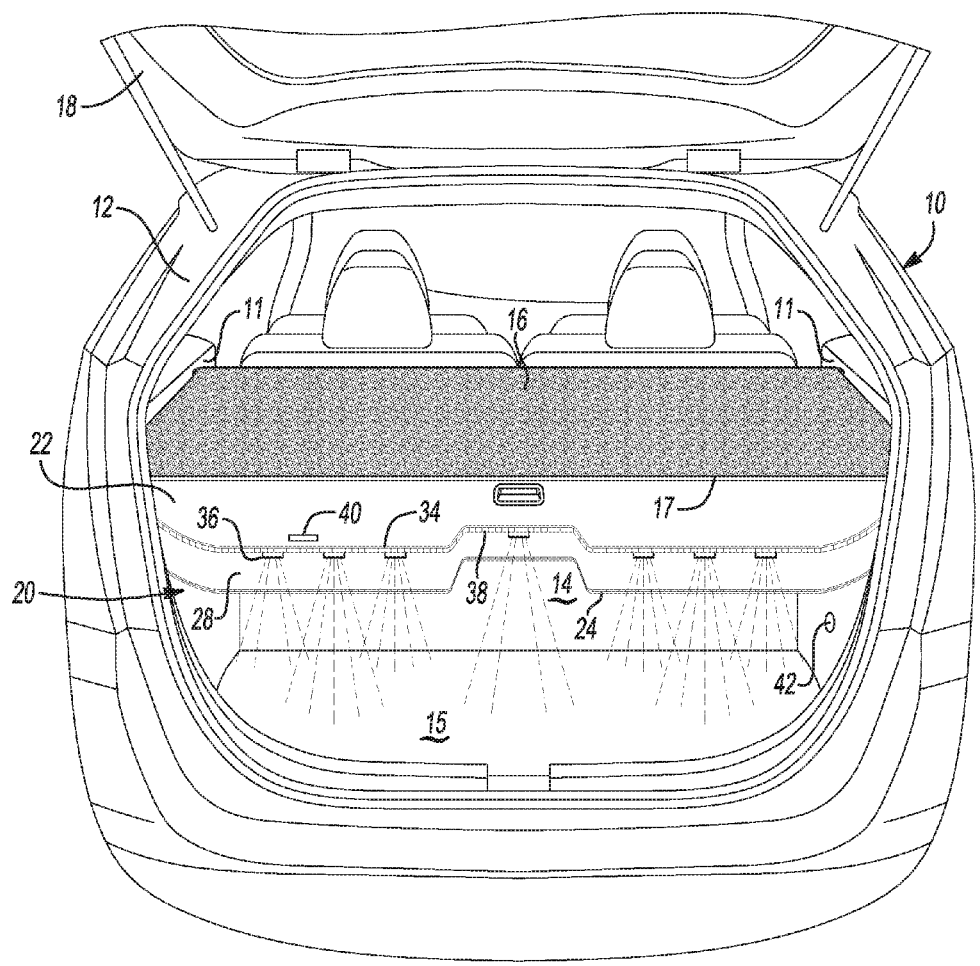
FIG. 3 is a perspective view of a cargo compartment shade extender for a vehicle using a lighting system.

FIG. 3 depicts a further embodiment of the storage pocket 20. The storage pocket 20 further includes a lead edge 34. The leading edge 34 may be the edge disposed at the lift-gate 18 and is consistent with the second end 17. The leading edge 34 includes a plurality of lights 36 disposed on a second surface 38 of the upper portion 22. The lights 36 may include a single incandescent bulb or provide for multiple incandescent bulbs disposed on the leading edge 34 of the upper portion 22. The lights may also be a single LED bulb or include a plurality of LED bulbs. The lights 36 are configured to illuminate the cargo compartment 14 of the vehicle 10. Providing illumination to the cargo compartment 14 allows easier identification of the items stored within the cargo compartment 14 when ambient conditions provide low visibility.

The lights 36 may be turned on either automatically or manually. Automatic illumination of the lights 36 may include use of a light sensor 40, for example a photoelectric cell for self-powering of the lights 36, to detect when illumination of the cargo compartment 14 is required. Manual illumination of the lights 36 may include use of the switch 42 and be activated upon a user demand. A combination of automatic and manual illumination may also be provided using a combination of the switch 42 and the light sensor 40. The lights 36 may be activated when the lower portion 24 is detached from the upper portion 22.

The lights 36 provide illumination when the vehicle 10 is parked and may be controlled to provide illumination when the lift-gate 18 is extended and the shade 16 is fully extended covering the cargo compartment 14. The lights 36 provide flexibility and adaptability to the storage compartment 28 of the storage pocket 20. Illumination from the lights 36 improves visibility within the cargo compartment 14. Improved visibility within the cargo compartment 14 facilitates use of the cargo compartment 14 when ambient lighting is reduced.

What is claimed is:

1. A vehicle storage compartment comprising:
   a lift-gate disposed between a pair of side panels defining a rear portion;
   a shade having a second end extendable away from a first end;
   a storage pocket, to partially extend from the second end over the rear portion, having upper and lower portions; and
   a zipper to interlock the upper and lower portions disposed across a vertical surface defined across generally horizontal faces of the upper and lower portions.

2. The storage compartment of claim 1, wherein the zipper separates the upper and lower portions between the generally horizontal faces of the upper and lower portions.

3. The storage compartment of claim 1, wherein the upper portion has a first surface defining a recess extending through the upper portion.

4. The storage compartment of claim 3, further comprising an insert disposed with the recess wherein the insert defines a cavity.

5. The storage compartment of claim 1, wherein the upper portion defines a recess extending from a first surface to a second surface of the upper portion.

6. A cargo compartment comprising:
   a shade having a second end extendable from a first end parallel to a floor;
   a pocket attached to the second end to partially cover the floor, and having upper and lower portions connected by a zipper that extends across a vertical surface defined by generally horizontal faces of the upper and lower portions, the upper portion having an edge; and
   a light disposed on a bottom surface of the edge.

7. The cover of claim 6, wherein the light is illuminated automatically upon opening the lift-gate.

8. An extension for a vehicle cargo compartment cover comprising:
   a shade anchored horizontally at a first end between two side panels of a rear portion of a vehicle, the shade extending from a second end at a distance from a floor of the vehicle;
   an upper portion attached to the second end having a first surface and a lead edge, the lead edge having a bottom surface;
   a lower portion attached to the second end disposed below the upper portion, the lower portion having a second surface;

an attachment mechanism connecting the upper and lower portions at the second end across a vertical surface defined by generally horizontal faces of the upper and lower portions; and a plurality of lights disposed on the bottom surface of the lead edge such that the plurality of lights are automatically illuminated upon opening a lift-gate.

9. The extension of claim 8, wherein the upper portion defines a relatively rigid material.

10. The extension of claim 8, wherein the lower portion defines a relatively flexible material.

11. The extension of claim 8, wherein the upper portion defines an opaque material.

\* \* \* \* \*